United States Patent
Kim et al.

(10) Patent No.: US 9,005,841 B2
(45) Date of Patent: Apr. 14, 2015

(54) POLYMER ELECTROLYTE MEMBRANE FOR FUEL CELL, MEMBRANE ELECTRODE ASSEMBLY AND FUEL CELL INCLUDING THE SAME

(75) Inventors: Hyuk Kim, Daejeon (KR); Seong Ho Choi, Daejeon (KR); Kyung A Sung, Daejeon (KR); SangWoo Lee, Daejeon (KR); Tae Geun Noh, Daejeon (KR); Ji Soo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 147 days.

(21) Appl. No.: 13/515,755

(22) PCT Filed: Dec. 17, 2010

(86) PCT No.: PCT/KR2010/009040
§ 371 (c)(1),
(2), (4) Date: Sep. 4, 2012

(87) PCT Pub. No.: WO2011/074905
PCT Pub. Date: Jun. 23, 2011

(65) Prior Publication Data
US 2013/0230790 A1    Sep. 5, 2013

(30) Foreign Application Priority Data

Dec. 18, 2009 (KR) .................. 10-2009-0126591
Nov. 26, 2010 (KR) .................. 10-2010-0118698

(51) Int. Cl.
*H01M 8/10*     (2006.01)

(52) U.S. Cl.
CPC .......... *H01M 8/1018* (2013.01); *H01M 8/1048* (2013.01); *H01M 8/1053* (2013.01); *Y02E 60/522* (2013.01)

(58) Field of Classification Search
USPC ......................................... 429/482, 492, 493
See application file for complete search history.

(56) References Cited

U.S. PATENT DOCUMENTS

| 5,547,551 A | 8/1996 | Bahar et al. |
| 5,599,614 A | 2/1997 | Bahar et al. |

(Continued)

FOREIGN PATENT DOCUMENTS

| CN | 1968894 A | 5/2007 |
| JP | 2004063430 A * | 2/2004 |

(Continued)

OTHER PUBLICATIONS

IPDL Machine Translation of the Detailed Description of JP 2004-063430A (Feb. 2004).*

(Continued)

*Primary Examiner* — Gregg Cantelmo
(74) *Attorney, Agent, or Firm* — McKenna Long & Aldridge LLP (57) ABSTRACT

Provided are a polymer electrolyte membrane for fuel cells, and a membrane electrode assembly and a fuel cell including the same. More specifically, provided is a polymer electrolyte membrane for fuel cells including a hydrocarbon-based cation exchange resin having hydrogen ion conductivity and fibrous nanoparticles having a hydrophilic group. By using the fibrous nanoparticles having a hydrophilic group in conjunction with the hydrocarbon-based cation exchange resin having hydrogen ion conductivity, it is possible to obtain a polymer electrolyte membrane for fuel cells that exhibits improved gas barrier properties and long-term resistance, without causing deterioration in performance of fuel cells, and a fuel cell including the polymer electrolyte membrane.

7 Claims, 8 Drawing Sheets

(56) References Cited

U.S. PATENT DOCUMENTS

| | | | |
|---|---|---|---|
| 5,981,097 A * | 11/1999 | Rajendran | 429/494 |
| 7,183,017 B2 * | 2/2007 | Taft et al. | 429/492 |
| 7,405,015 B2 * | 7/2008 | Xiao et al. | 429/481 |
| 2003/0072991 A1 * | 4/2003 | Matsubara et al. | 429/42 |
| 2004/0188248 A1 * | 9/2004 | Sawa | 204/295 |
| 2006/0102869 A1 | 5/2006 | Cavaille et al. | |
| 2006/0292415 A1 | 12/2006 | Song et al. | |
| 2008/0134939 A1 | 6/2008 | Arpac et al. | |
| 2009/0076356 A1 * | 3/2009 | Simpson et al. | 600/347 |

FOREIGN PATENT DOCUMENTS

| | | | |
|---|---|---|---|
| JP | 2005-285549 | | 10/2005 |
| JP | 2007-529323 | | 10/2007 |
| JP | 2007-529323 A | | 10/2007 |
| JP | 2008-251314 | | 10/2008 |
| JP | 2008251314 A | * | 10/2008 |
| JP | 2009-243031 | | 10/2009 |
| JP | 2010211965 A | * | 9/2010 |
| KR | 10-2004-0080561 | | 9/2004 |
| KR | 10-2007-0014679 | | 2/2007 |
| KR | 10-0800313 B1 | | 2/2008 |
| KR | 100800313 | | 2/2008 |
| KR | 10-2008-0022675 | | 3/2008 |
| KR | 10-2008-0022675 A | | 3/2008 |

OTHER PUBLICATIONS

IPDL Machine Translation of the Detailed Description of JP 2008-251314A (Oct. 2008).*

* cited by examiner

FIG. 10

POLYMER ELECTROLYTE MEMBRANE FOR FUEL CELL, MEMBRANE ELECTRODE ASSEMBLY AND FUEL CELL INCLUDING THE SAME

This application is a National Stage Entry of International Application No. PCT/KR2010/009040, filed Dec. 17, 2010, and claims the benefit of Korean Application Nos. 10-2009-0126591, filed on Dec. 18, 2009, and 10-2010-0118698, filed on Nov. 26, 2010, which are hereby incorporated by reference in their entirety for all purposes as if fully set forth herein.

TECHNICAL FIELD

The present invention relates to a polymer electrolyte membrane for fuel cells to improve mechanical properties of an electrolyte membrane. More specifically, the present invention relates to a polymer electrolyte membrane for fuel cells that comprise fibrous nanoparticles having at least one hydrophilic group, thereby improving mechanical properties thereof, and a membrane electrode assembly and a fuel cell comprising the same.

BACKGROUND ART

Recently, the predicted depletion of conventional energy sources such as oil and coal has brought about an increasing interest in alternative energy sources. In particular, a fuel cell, as an energy storage system, is advantageous in that it is highly efficient, does not discharge pollutants such as NOx and SOx, and the fuel used is abundant, and thus attracts much attention.

A fuel cell is a power generation system which converts chemical reaction energy of a fuel and an oxidizing agent into electrical energy. Typically, hydrogen, methanol or hydrocarbons such as butane are used as the fuel and oxygen is used as the oxidizing agent.

Figure 1:
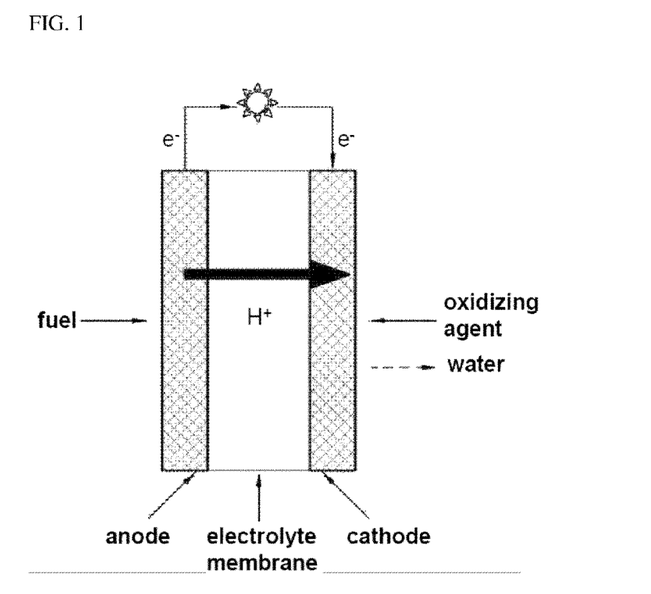
FIG. 1 is a view illustrating a principle according to which a fuel cell generates electricity.

The most basic unit to generate electricity in the fuel cell is a membrane electrode assembly (MEA), which is composed of an electrolyte membrane, and an anode and a cathode that are formed on both surfaces of the electrolyte membrane. Referring to FIG. 1 and Reaction Scheme I illustrating a mechanism via which a fuel cell generates electricity (reaction scheme of the fuel cell in the case where hydrogen is used as the fuel), at the anode, oxidation occurs to produce hydrogen ions and electrons and the hydrogen ions move through the electrolyte membrane to the cathode. At the cathode, oxygen (oxidizing agent) and hydrogen ions transferred through the electrolyte membrane react with electrons to produce water. Based on these reactions, electron transfer occurs in an external circuit.

At anode electrode: $H2 \rightarrow 2H+ + 2e-$

At cathode electrode: $\frac{1}{2}O2 + 2H+ + 2e- \rightarrow H2O$

Overall reaction: $H2 + \frac{1}{2}O2 \rightarrow H2Os$       [Reaction Scheme I]

In this reaction, the polymer electrolyte membrane undergoes 15 to 30% of variation in membrane thickness and variation in volume depending on temperature and hydration, and in particular, undergoes 200% or more of variation in volume by 3 to 50% by weight of methanol fuels. Accordingly, electrolyte membranes undergo repeated swelling and contraction depending on operating conditions of fuel cells and polymer chains disentangle in polymer electrolyte membranes due to variation in volume, mechanical strength is reduced and fine pores or cracks occur.

These fine pores or cracks cause crossover of hydrogen or methanol crossover, thus resulting in deterioration in durability of fuel cells.

For this reason, a perfluorosulfonic acid resin membrane made of a perfluorosulfonic acid resin (trade name: Nafion) with superior conductivity, mechanical properties and chemical resistance is generally used as the polymer electrolyte membrane. However, the perfluorosulfonic acid resin is disadvantageously expensive, thus increasing manufacturing costs of fuel cells.

Therefore, interest in hydrocarbon electrolyte membranes that are cheaper than fluorine electrolyte membranes such as perfluorosulfonic acid resins is increasing. Hydrocarbon electrolyte membranes undergo relatively little deterioration in chemical resistance by-products produced by gas permeation during actual operation of fuel cells due to low gas permeation as compared to fluorine electrolyte membranes. However, general hydrocarbon electrolyte membranes undergo great variation in volume depending on variation in humidification conditions and are very fragile, and thus, disadvantageously, mechanical resistance during actual operation of fuel cells is difficult to secure. For example, hydrocarbon membranes are considerably vulnerable in cycle testing including repeated humidification and dehumidification that is a representative method for evaluating mechanical resistance of electrolyte membranes.

In addition, improvement of electrolyte membrane resins or filling a porous material with an electrolyte membrane resin is generally attempted to enhance durability of polymer electrolyte membranes for fuel cells. However, in a case in which strength of the electrolyte membrane increases, ion exchange capability is generally deteriorated, and the method of filling the porous material exhibits great improvement in resistance, but has problems of great difficulties associated with processes and increase in costs of raw materials. In particular, hydrocarbon electrolyte membrane resins undergo great variation in volume depending on variation in humidification conditions and thus cannot obtain significant improvement in resistance in spite of using the porous material. As another method, there is preparation by mixing an electrolyte membrane resin with a substance to improve resistance. This method disadvantageously impedes a mixing process and, in particular, does not exhibit remarkable effects.

Accordingly, attempts to solve these problems have been made in the art and the present invention has been developed under these technical circumstances.

DISCLOSURE

Technical Problem

Therefore, the present invention has been made to solve the above problems and other technical problems that have yet to be resolved.

Specifically, it is one object of the present invention to provide a polymer electrolyte membrane that comprises fibrous nanoparticles having at least one hydrophilic group and thus exhibits remarkably improved mechanical properties, as compared to conventional polymer electrolyte membranes for fuel cells.

It is another object of the present invention to provide a membrane electrode assembly comprising the polymer electrolyte membrane for fuel cells.

It is yet another object of the present invention to provide a fuel cell comprising the polymer electrolyte membrane for fuel cells.

Technical Solution

In accordance with one aspect of the present invention, provided is a polymer electrolyte membrane for fuel cells that contains a hydrocarbon-based cation exchange resin having hydrogen ion conductivity and fibrous nanoparticles having a hydrophilic group.

As such, when the membrane contains the hydrocarbon-based cation exchange resin having hydrogen ion conductivity and fibrous nanoparticles having a hydrophilic group, the fibrous nanoparticles having a hydrophilic group synchronize with swelling and contraction of the hydrocarbon-based cation exchange resin, thus reducing stress by variation in volume, and presence of the hydrophilic group enables reduction of contraction by moisture loss even under low humidity conditions and improvement in tensile strength upon exposure to moisture. In addition, the fibrous nanoparticles have a small particle size and a large surface area and can be uniformly dispersed in the cation exchange resin having hydrogen ion conductivity due to the hydrophilic group, thus greatly contributing to improvement in mechanical properties of the produced polymer electrolyte membrane. In the process aspect, as compared to a case in which a porous material or the like is used, the process is greatly simple. Accordingly, when fuel cells are manufactured using the polymer electrolyte membrane, fuel cells that exhibit superior long-term resistance and low manufacturing costs can be manufactured.

In the polymer electrolyte membrane for fuel cells according to the present invention, a mix ratio of the hydrocarbon-based cation exchange resin having hydrogen ion conductivity and the fibrous nanoparticles having a hydrophilic group is preferably 99.9:0.1 to 91:9 on a weight ratio basis. When the content of the fibrous nanoparticles having a hydrophilic group is excessively low, it is difficult to secure mechanical properties to a desired level and on the other hand, when the content is excessively high, fibrous nanoparticles may partially aggregate and form passages for crossover of fuels. Accordingly, these cases are undesired. For these reasons, the fibrous nanoparticles having a hydrophilic group are preferably present in an amount of 0.2 to 8% by weight, particularly preferably 0.2 to 5% by weight, based on the total weight of the electrolyte membrane.

In a preferred embodiment, the fibrous nanoparticles having a hydrophilic group may have a diameter of 10 to 200 nm and a length of 1 to 20 μm.

Since the fibrous nanoparticles having a hydrophilic group have a nano-scale particle size, they can be more uniformly dispersed in the cation exchange resin and improve durability in spite of being present in a small amount.

However, when the diameter of the fibrous nanoparticles having a hydrophilic group is excessively small, the fibrous nanoparticles cannot contribute to improvement of mechanical strength and, on the other hand, when the diameter is excessively large, the effect of improvement in binding force by increase in surface area, a property of fibrous nanoparticles, cannot be obtained. In addition, when the length of the fibrous nanoparticles having a hydrophilic group is short, the nanoparticles cannot have a fibrous form, and on the other hand, when the length is excessively long, dispersibility in the cation exchange resin is deteriorated. Accordingly, these cases are undesirable.

In another preferred embodiment, the fibrous nanoparticles having a hydrophilic group may have an aspect ratio of 1:5 to 1:2,000.

When the aspect ratio is excessively small, the nanoparticles cannot have a fibrous form and, as a result, cannot contribute to improvement of mechanical strength and, on the other hand, when the aspect ratio is excessively large, dispersibility is deteriorated and fibrous nanoparticles may partially aggregate in the cation exchange resin and serve a passage of fuels and the like. Accordingly, these cases are undesirable.

The type of the fibrous nanoparticles having a hydrophilic group is not particularly limited so long as the nanoparticles have the afore-mentioned properties. Examples of preferred fibrous nanoparticles include one or more selected from the group consisting of cellulose nanofibers and polyvinylalcohol (PVA) nanofibers. Among these, cellulose nanofibers are particularly preferred.

Cellulose nanofibers include a crystalline region and an amorphous region, the crystalline region increases elasticity and tensile strength of materials and the amorphous region absorbs water and swells, or improves flexibility of materials.

The cellulose nanofibers or polyvinylalcohol (PVA) nanofibers have a hydroxyl group (—OH) as a hydrophilic group.

In a preferred embodiment, the hydroxyl group of the cellulose nanofibers or polyvinylalcohol (PVA) is preferably present in an amount of 5 to 90% with respect to the total site of the hydroxyl group. When the content of the hydroxyl group is excessively low, the degree of absorbing water and thereby swelling is low and binding force with the cation resin decreases, as a result, the hydroxyl group cannot contribute to improvement in mechanical strength of the fuel cell membrane and when the content is excessively high, miscibility with a solvent is deteriorated and it is difficult to manufacture polymer electrolyte membranes for fuel cells. Accordingly these cases are undesirable.

The content of the hydroxyl group is preferably 10 to 80%, particularly preferably 20 to 70%.

For example, the cellulose nanofibers may be roughly classified into cellulose nanofibers in which hydroxyl groups are not substituted and cellulose nanofibers partially substituted with hydroxyl groups such as cellulose ester nanofibers, cellulose ether nanofibers. These nanofibers may be used alone or in combination of two or more types. Specific examples thereof include, but are not limited to, one or more selected from the group consisting of: cellulose nanofibers in which hydroxyl groups are not substituted; cellulose nanofibers substituted with an acetyl group or a derivative thereof; cellulose sulfate nanofibers; cellulose phosphate nanofibers; cellulose nanofibers substituted with a C1-C10 alkyl group or a derivative thereof such as methyl cellulose nanofibers, ethyl cellulose nanofibers, carboxymethyl cellulose nanofibers and hydroxyethyl cellulose nanofibers, preferably cellulose nanofibers substituted with a C2-C6 alkyl group or a derivative thereof. Of these, cellulose nanofibers substituted with a C2-C10 alkyl group or a derivative thereof, and cellulose nanofibers substituted with an acetyl group or a derivative thereof are more preferred in terms of low solubility.

For example, the cellulose may have a molecular weight of 30,000 to 3,000,000 and the molecular weight may be out of the exemplary range in consideration of various factors such as aspect ratio of fibrous nanoparticles, the type of substituent and substitution degree.

In the present invention, the hydrocarbon-based cation exchange resin having hydrogen ion conductivity is for example a polymer that is provided at a side chain thereof with one or more cation exchange groups selected from the group consisting of a sulfonic acid group, a carboxylic acid group, phosphoric acid group, a phosphonic acid group and derivatives thereof.

Specific examples thereof include, but are not limited to, one or more selected from the group consisting of benzimidazole polymers, polyimide polymers, polyetherimide polymers, polyphenylene sulfide polymers, polysulfone polymers, polyether sulfone polymers, polyether ketone polymers, polyether ether ketone polymers and polyphenyl quinoxaline polymers. Of these, polyether ether ketone polymers, polyether sulfone polymers, or mixtures thereof are more preferred.

In some cases, the polymer electrolyte membrane for fuel cells may comprise two or more cation exchange resin membranes having hydrogen ion conductivity that are laminated such that they face one another and the polymer electrolyte membrane for fuel cells is interposed therebetween. The laminate may be formed by applying respective membranes, followed by hot-pressing and known membrane lamination methods may be used without limitation.

The present invention also provides a membrane electrode assembly for fuel cells in which the polymer electrolyte membrane for fuel cells is interposed between an anode and a cathode that face each other.

The membrane electrode assembly for fuel cells advantageously greatly improves mechanical strength of internal polymer electrolyte membranes during operation of fuel cells and thus superior resistance.

In addition, the present invention provides a fuel cell that comprises the membrane electrode assembly for fuel cells and one or more separation plates, the fuel cell comprising: one or more electricity generators to generate electricity through electrochemical reaction of a fuel and an oxidizing agent; a fuel feeder to feed fuel to the electricity generators; and an oxidizing agent feeder to feed an oxidizing agent to the electricity generators.

The membrane electrode assembly manufactured using the polymer electrolyte membrane, and structure and manufacturing method of the fuel cell are known in the art and a more detailed description thereof will thus be omitted herein.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following Examples. These examples are provided only to illustrate the present invention and should not be construed as limiting the scope and spirit of the present invention.

Figure 2:
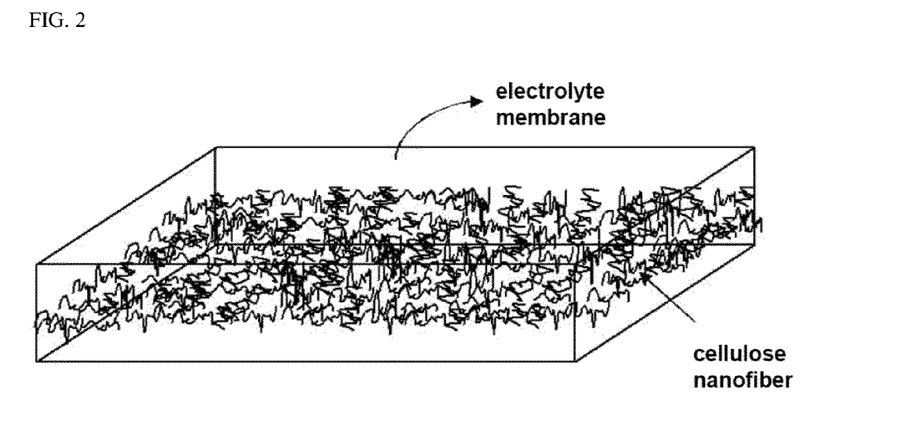
FIG. 2 is a view schematically illustrating a polymer electrolyte membrane according to one embodiment of the present invention.
Figure 3:
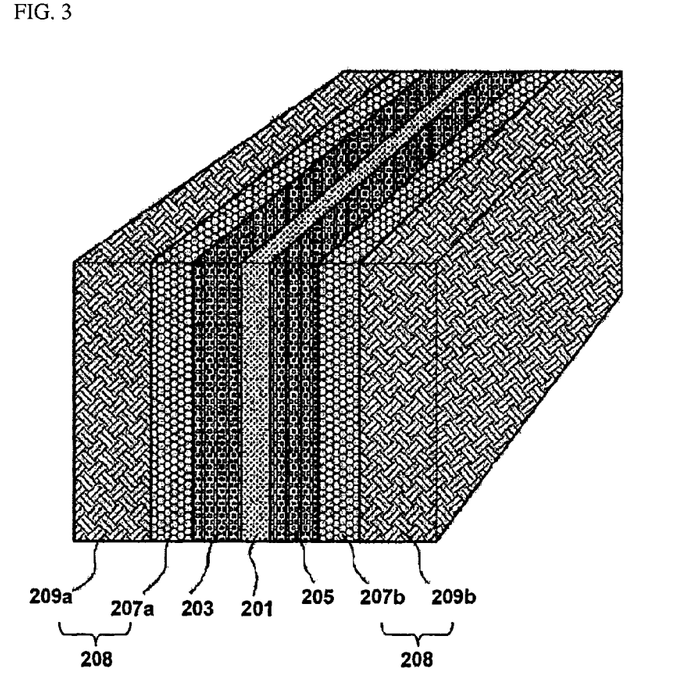
FIG. 3 is a view schematically illustrating the structure of a membrane electrode assembly according to one embodiment of the present invention.

FIG. 2 is a view schematically illustrating a polymer electrolyte membrane according to one embodiment of the present invention. FIG. 3 is a view schematically illustrating the structure of a membrane electrode assembly according to one embodiment of the present invention.

Referring to these drawings, the polymer electrolyte membrane for fuel cells 201 according to the present invention comprises cellulose nanofibers.

In addition, the membrane electrode assembly for fuel cells according to the present invention includes an anode electrode 203 and a cathode electrode 205 that face each other such that a polymer electrolyte membrane 201 is interposed therebetween. The anode electrode 203 and the cathode electrode 205 may further include a gas diffusion layer 208, and the gas diffusion layer 208 may include base materials 209*a* and 209*b*, and microporous layers 207*a* and 207*b* arranged on one surface of the base materials.

Figure 4:
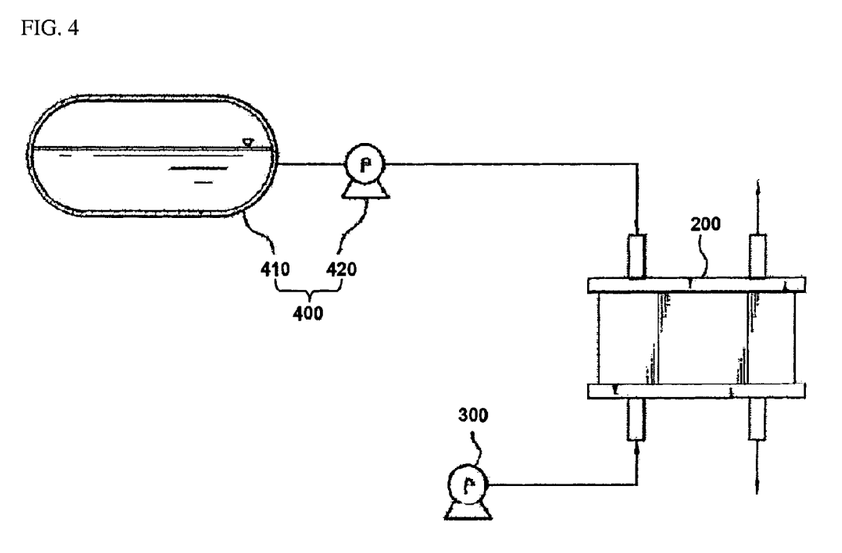
FIG. 4 is a view schematically illustrating the structure of a fuel cell according to one embodiment of the present invention.

FIG. 4 is a view schematically illustrating the structure of a fuel cell according to one embodiment of the present invention.

Referring to FIG. 4, the fuel cell of the present invention includes an electricity generator 200, a fuel feeder 400 and an oxidizing agent feeder 300. The fuel cell of the present invention includes an anode electrode and a cathode electrode that face each other, and one or more membrane electrode assemblies that are interposed between the anode electrode and the cathode electrode, and includes the composite electrolyte membrane for fuel cells according to the present invention, and one or more separation plates, and includes: one or more electricity generators 200 to generate electricity through electrochemical reaction of a fuel and an oxidizing agent; a fuel feeder 400 to feed a fuel to the electricity generators; and an oxidizing agent feeder 300 to feed an oxidizing agent to the electricity generators.

The electricity generator 200 includes one or two or more membrane electrode assemblies according to the present invention. When two or more membrane electrode assemblies are contained, a separator interposed therebetween may be present. The separator prevents membrane electrode assemblies from being electrically connected and transfers fuels and oxidizing agents supplied from the outside to the membrane electrode assemblies.

The fuel feeder 400 feeds a fuel to the electricity generator and includes a fuel tank 410 to store a fuel and a pump 420 to supply the fuel stored in the fuel tank 410 to the electricity generator 200. The fuel may be hydrogen or hydrocarbon fuel in a gas or liquid state and examples of the hydrocarbon fuel include methanol, ethanol, propanol, butanol and natural gas.

The oxidizing agent feeder 300 feeds an oxidizing agent to the electricity generator. A representative example of the oxidizing agent is oxygen and oxygen or air may be used by injection into the pump 300.

Now, the present invention will be described in more detail with reference to the following examples. These examples should not be construed as limiting the scope and spirit of the present invention.

Example 1

An ethyl cellulose powder (Dow Inc., ETHOCEL™, substituted with 48-49.5% of ethyl group) was dispersed in DMSO and cellulose was decomposed through treatment several times in a solution state using a microfluidizer to produce nanofibers. The ethyl cellulose nanofibers thus produced had a diameter of 10 to 100 nm and a length of 1 to 10 μm.

0.2 parts by weight of the cellulose nanofibers and 99.8 parts by weight of sulfonated polyether ether ketone were added to 2,000 parts by weight of DMSO as a solvent, followed by homogeneous dissolution. The solution was applied to a substrate by solution casting using a film applicator to form a membrane with a thickness of 20 μm, the temperature was slowly elevated to 80° C., and the membrane was dried for about 24 hours, dried at 120° C. for 24 hours again and proton exchange was performed by treatment with sulfuric acid to produce a final polymer electrolyte membrane.

A platinum-supported carbon catalyst and a Nafion ionomer were dissolved in a mixed solvent of water and isopropyl alcohol, the resulting solution was applied to a carbon paper to prepare two electrode diffusion layers containing 0.4 mg/cm2 of platinum. A the polymer electrolyte membrane was inserted into the two electrode diffusion layers, followed by hot-pressing at 140° C. for 5 minutes to manufacture an electrode membrane assembly and a fuel cell having a structure as shown in FIG. 4.

Example 2

A polymer electrolyte membrane, a membrane electrode assembly and a fuel cell were manufactured in the same manner as in Example 1 except that 99 parts by weight of sulfonated polyether ether ketone was used and 1 part by weight of ethyl cellulose nanofibers were used.

Example 3

A polymer electrolyte membrane, a membrane electrode assembly and a fuel cell were manufactured in the same manner as in Example 1 except that 97 parts by weight of sulfonated polyether ether ketone was used and 3 parts by weight of ethyl cellulose nanofibers were used.

Example 4

A polymer electrolyte membrane, a membrane electrode assembly and a fuel cell were manufactured in the same manner as in Example 1 except that 95 parts by weight of sulfonated polyether ether ketone was used and 5 parts by weight of ethyl cellulose nanofibers were used.

Example 5

A polymer electrolyte membrane, a membrane electrode assembly and a fuel cell were manufactured in the same manner as in Example 1 except that 92 parts by weight of sulfonated polyether ether ketone was used and 8 parts by weight of ethyl cellulose nanofibers were used.

Comparative Example 1

A polymer electrolyte membrane, a membrane electrode assembly and a fuel cell were manufactured in the same manner as in Example 1 except that cellulose nanofibers were not used.

Comparative Example 2

A polymer electrolyte membrane, a membrane electrode assembly and a fuel cell were manufactured in the same manner as in Example 1 except that 90 parts by weight of sulfonated polyether ether ketone was used and 10 parts by weight of ethyl cellulose nanofibers were used.

Comparative Example 3

A polymer electrolyte membrane, a membrane electrode assembly and a fuel cell were manufactured in the same manner as in Example 3 except that instead of nanofibers, an ethyl cellulose powder (Dow Inc., ETHOCEL™, substituted with 48-49.5% of an ethyl group) was used.

Experimental Example 1

Cell performance of the respective fuel cells manufactured in Examples 1 to 5 and Comparative Examples 1 to 3 was measured under 100% RH and 50% RH. The results are shown in FIGS. 5 to 8. Measurement was carried out at a temperature of 70° C.

Figure 5:
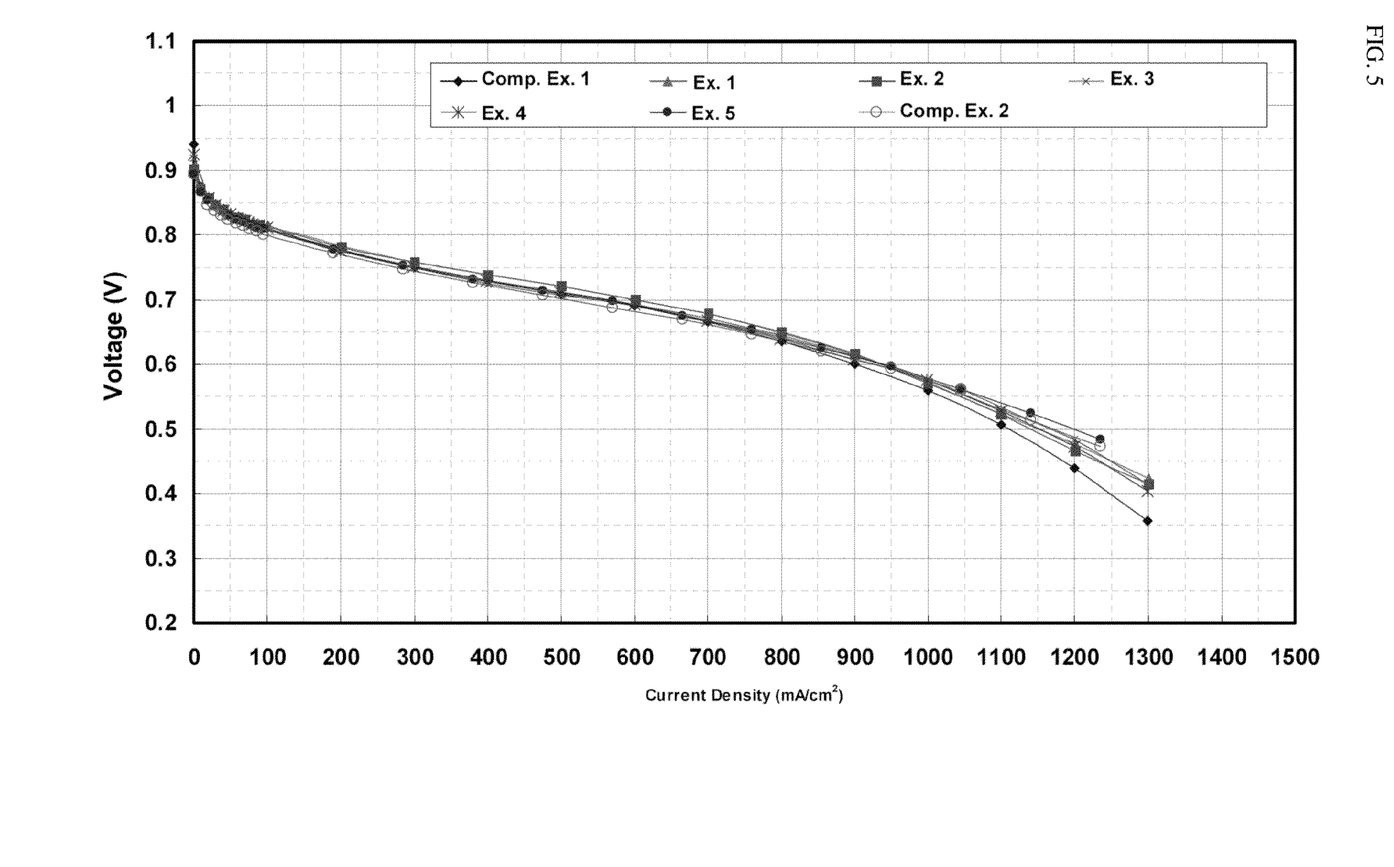
FIGS. 5 and 7 are graphs showing performance tests under 100% RH in fuel cells of Example and Comparative Example according to one embodiment of the present invention.
Figure 6:
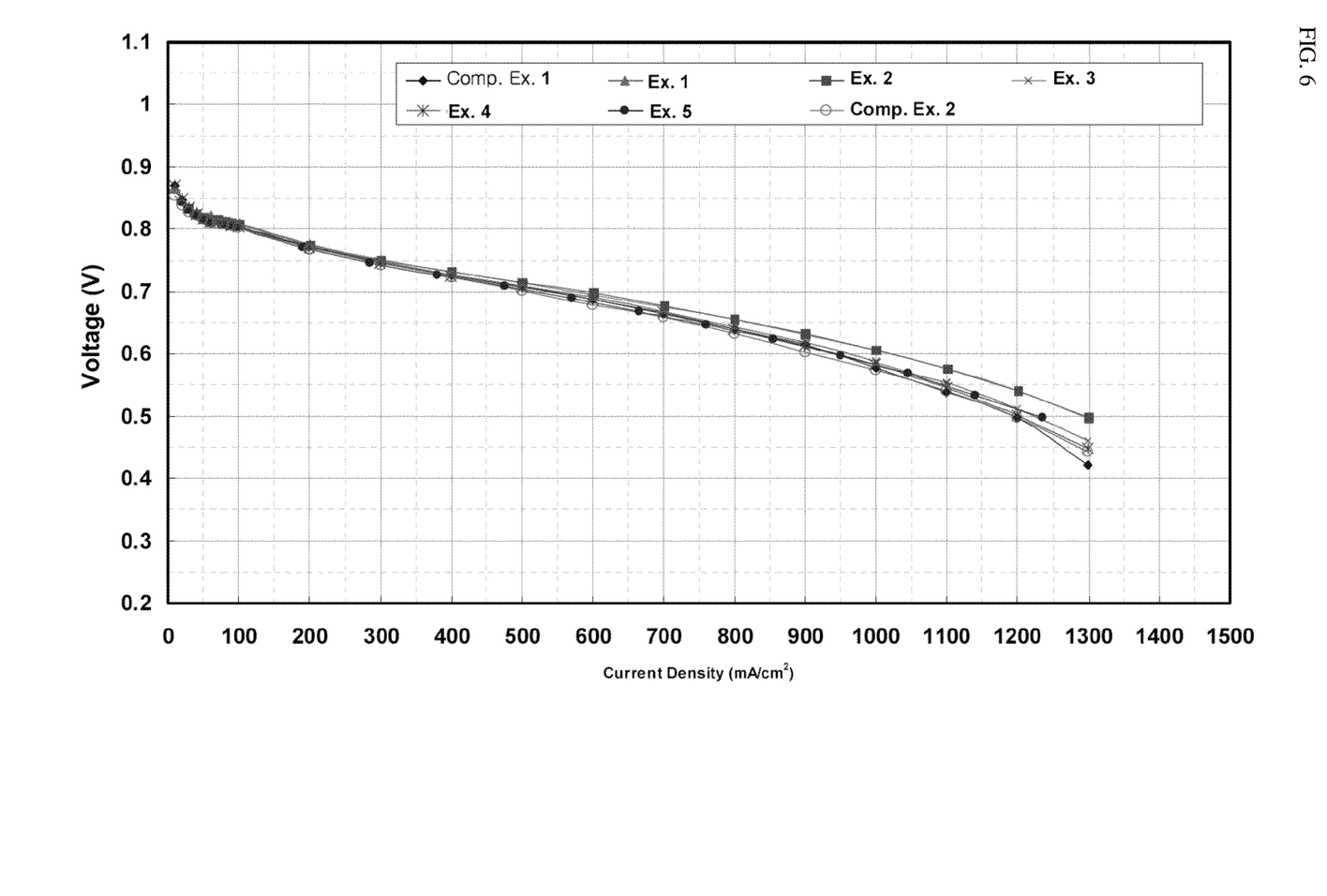
FIGS. 6 and 8 are graphs showing performance tests under 50% RH in fuel cells of Examples and Comparative Examples according to one embodiment of the present invention.

First, it can be seen from FIGS. 5 and 6 that performance of fuel cells manufactured using electrolyte membranes manufactured in Examples 1 to 5 under 100% RH and 50% RH was comparable to or partially improved, as compared to those of fuel cells of electrolyte membranes manufactured in Comparative Example 1 using no cellulose nanofibers.

These results are off a common concept in which an attempt to improve strength of electrolyte membrane causes deterioration in cation conductivity of the electrolyte membrane and thus performance of fuel cells.

Figure 7:
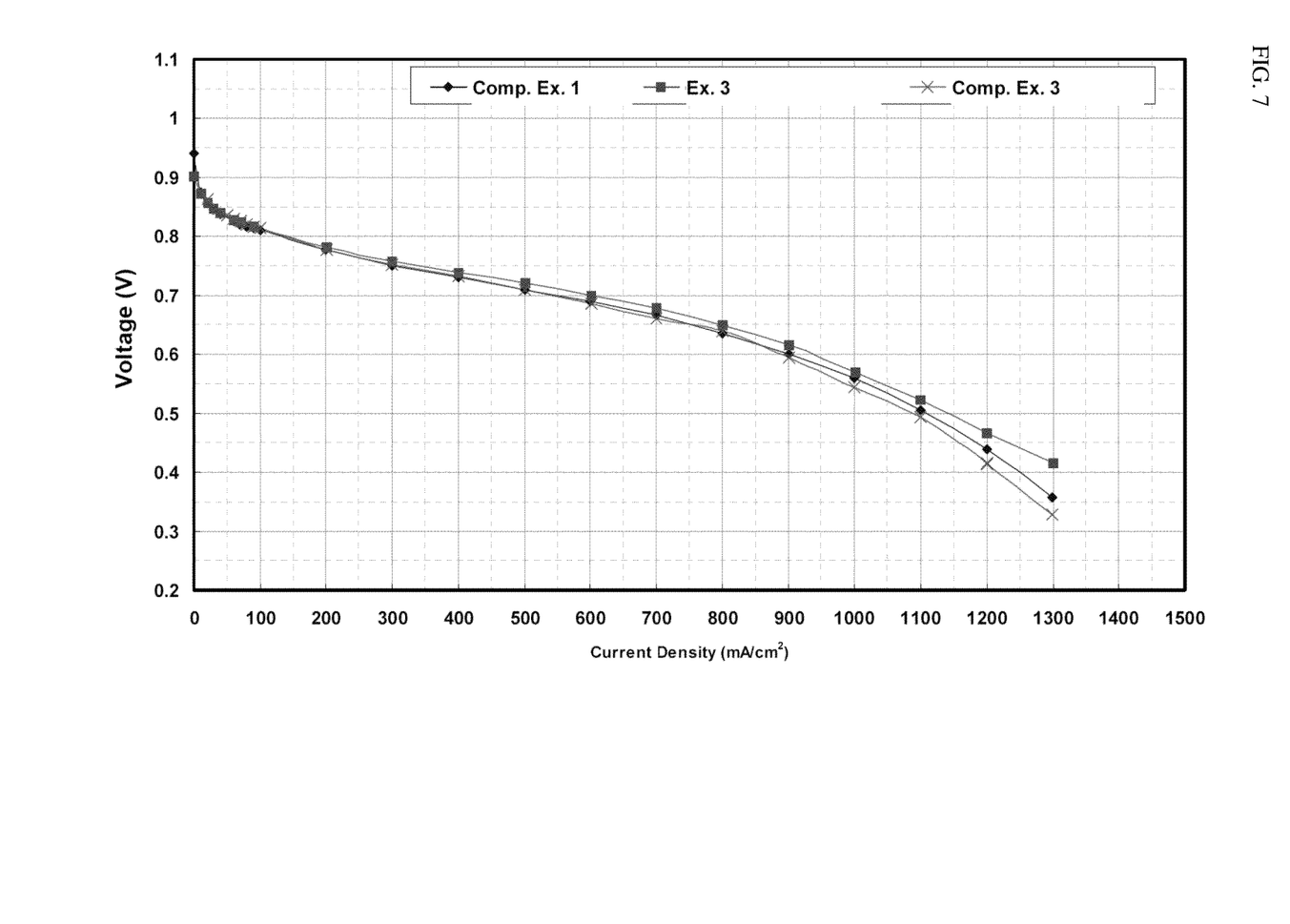
Figure 8:
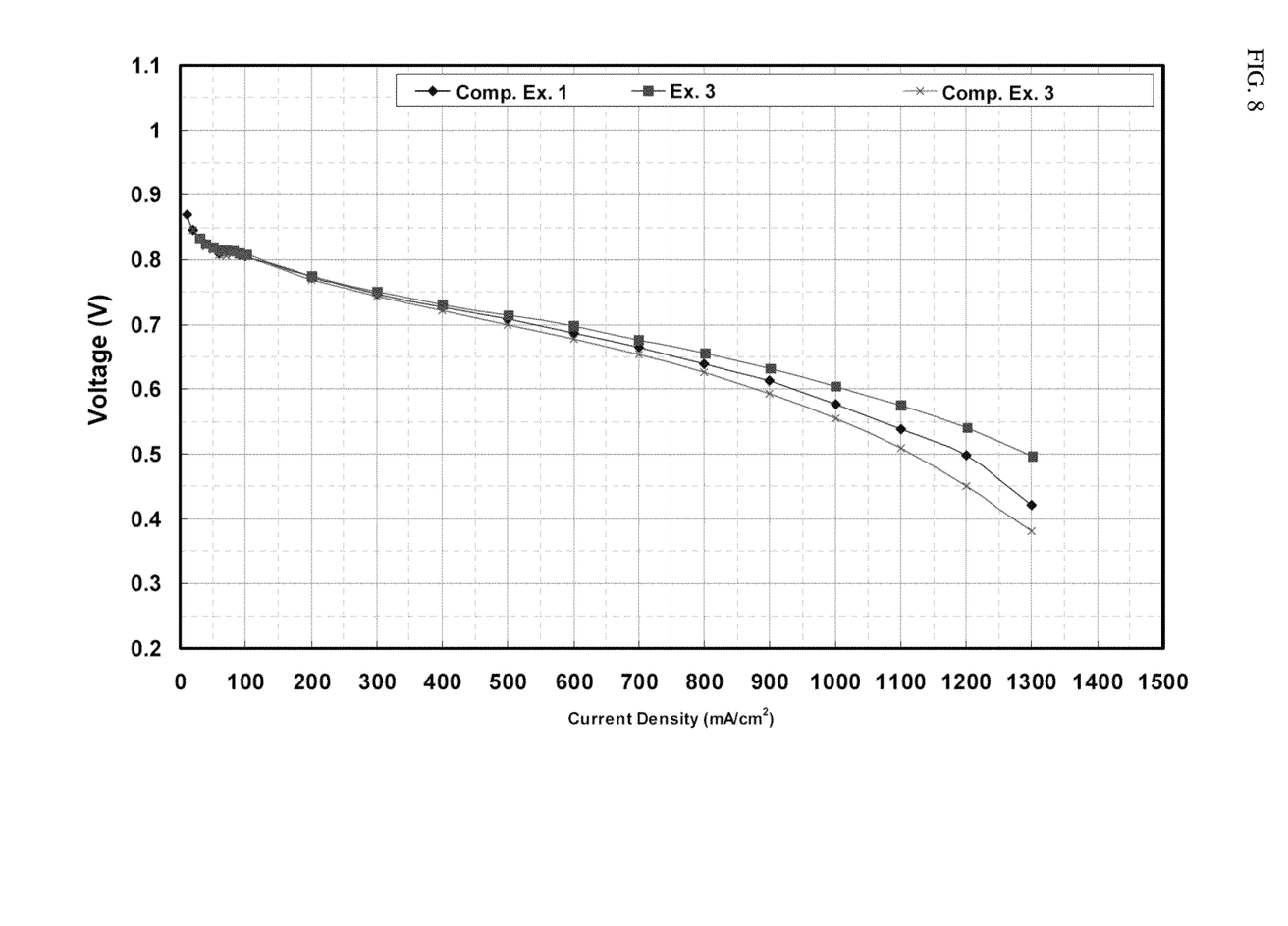

In addition, it can be seen from FIGS. 7 and 8 that Comparing Example 3 and Comparative Example 3 having an identical cellulose content under 100% RH and 50% RH conditions, Example 3 containing cellulose nanofibers exhibits equivalent or superior performance to Comparative Example 1, while Comparative Example 3 containing a cellulose powder exhibits equivalent or superior performance to Comparative Example 1.

The reason for these results is not clearly known, but is thought, based on from the results, to be that cellulose nanofibers having a nano size and a hydrophilic group are finely dispersed in the hydrocarbon-based cation exchange resin and thus cause improvement in cation mobility.

Experimental Example 2

The membrane electrode assemblies manufactured in Examples 1 to 5 and Comparative Examples 1 to 3 were applied to general unit batteries, RH 150% and RH 0% nitrogen were fed to gas inlets disposed at both sides of unit batteries at 80° C. while switching, to perform humidification/dehumidification cycle tests. During the tests, hydrogen (H2) crossover was periodically measured and testing was ended when hydrogen (H2) crossover rapidly increased. The test results are shown in graphs of FIGS. 9 to 10.

Figure 9:
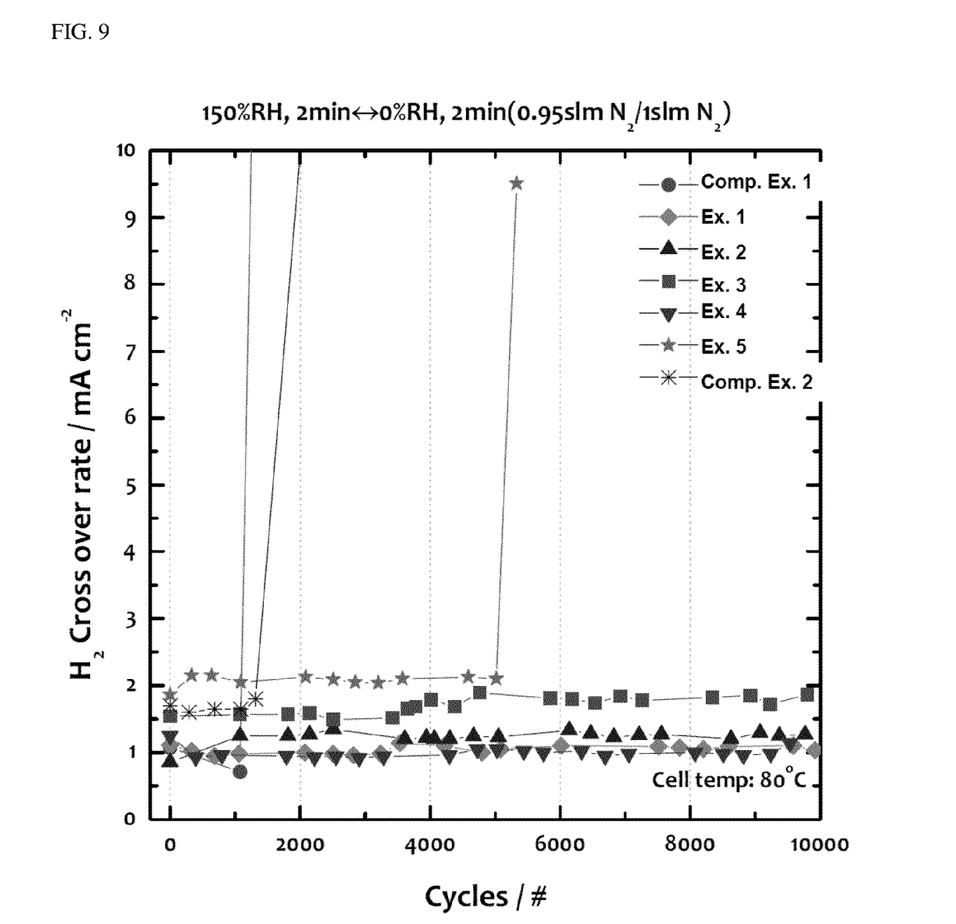
FIGS. 9 and 10 are graphs showing humidification/dehumidification cycle test results of membrane electrode assemblies using the polymer electrolyte membrane for fuel cells of Examples and Comparative Examples.

It can be seen from FIG. 9 that membrane electrode assemblies manufactured in Comparative Examples 1 and 2 undergo rapid increase in hydrogen (H2) crossover at about 1,000 cycles. This is the reason that fine pores and cracks are formed in polymer electrolyte membranes due to repeated swelling and contractions and serve as passages of hydrogen (H2). On the other hand, membrane electrode assemblies in accordance with Examples 1 to 4 do not undergo rapid increase in hydrogen (H2) crossover and maintain a range similar to an initial state during 10,000 cycles.

In addition, Example 5 undergoes a rapid increase in hydrogen (H2) crossover at about 5,000 cycles, but exhibits a remarkable increase in the number of cycles at which hydrogen crossover occurs as compared to the results of Comparative Example 1.

Figure 10:
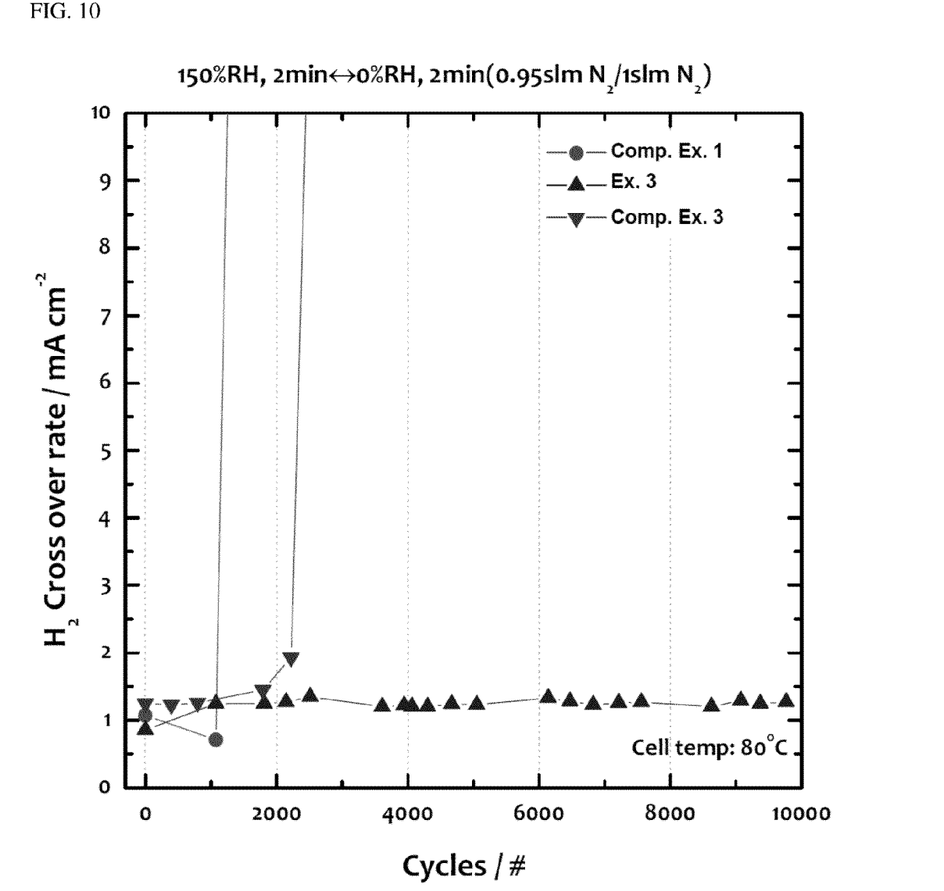

It can be seen from FIG. 10, that the membrane electrode assembly manufactured in Comparative Example 3 undergoes rapid increase in hydrogen (H2) crossover at about 2,000 cycles. On the other hand, Example 3 having nanofibers containing the identical content of cellulose does not exhibit a rapid increase in hydrogen (H2) crossover 10,000 cycles and maintains a range similar to an initial state.

These results are thought to be due to the fact that cellulose nanofibers used in Examples 1 to 5 are uniformly dispersed in the hydrocarbon electrolyte membrane and cause substantial improvement in mechanical properties of the polymer electrolyte membrane, as mentioned above. In Comparative Example 2 containing excess cellulose nanofibers, the cellulose nanofibers are present in a partial aggregate. This structure is thought to serve as a passage of hydrogen (H2), thus inhibiting improvement in resistance.

INDUSTRIAL APPLICABILITY

As apparent from the foregoing, the polymer electrolyte membrane for fuel cells according to the present invention improves gas barrier properties, long-term resistance and the like, without causing deterioration in performance of fuel cells in an electrolyte membrane based on a hydrocarbon-based cation exchange resin.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polymer electrolyte membrane for fuel cells comprising:
   a hydrocarbon-based cation exchange resin having hydrogen ion conductivity; and
   fibrous nanoparticles having a hydrophilic group,
   wherein a mix ratio of the hydrocarbon-based cation exchange resin having hydrogen ion conductivity and the fibrous nanoparticles having a hydrophilic group is 99.9:0.1 to 91:9 on a weight ratio basis,
   wherein the fibrous nanoparticles having a hydrophilic group is cellulose nanofibers, wherein the fibrous nanoparticles having a hydrophilic group has a diameter of 1 to 200 nm and a length of 1 to 20 μm and an aspect ratio of 1:5 to 1:2,000,
   wherein the hydrophilic group is a hydroxyl group (-OH) and is present in an amount of 5 to 90% in the cellulose nanofibers, with respect to the total sites of the hydroxyl group (-OH), and
   wherein the hydrocarbon-based cation exchange resin is one or more selected from the group consisting of benzimidazole polymers, polyimide polymers, polyetherimide polymers, polyphenylene sulfide polymers, polysulfone polymers, polyether sulfone polymers, polyether ketone polymers, polyether ether ketone polymers and polyphenyl quinoxaline polymers.

2. The polymer electrolyte membrane according to claim 1, wherein the cellulose nanofibers are one or more selected from the group consisting of: cellulose nanofibers in which hydroxyl groups are not substituted; cellulose nanofibers substituted with an acetyl group or a derivative thereof; cellulose sulfate nanofibers; cellulose phosphate nanofibers; and cellulose nanofibers substituted with a $C_1$-$C_{10}$ alkyl group or a derivative thereof.

3. The polymer electrolyte membrane according to claim 2, wherein the cellulose nanofibers are one or more selected from the group consisting of cellulose nanofibers in which hydroxyl groups are not substituted; cellulose nanofibers substituted with an acetyl group or a derivative thereof; cellulose sulfate nanofibers; cellulose phosphate nanofibers; and cellulose nanofibers substituted with a $C_2$-$C_6$ alkyl group or a derivative thereof.

4. The polymer electrolyte membrane according to claim 1, wherein the hydrocarbon-based cation exchange resin having hydrogen ion conductivity is a polymer provided at a side chain thereof with one or more cation exchange groups selected from the group consisting of a sulfonic acid group, a carboxylic acid group, phosphoric acid group, a phosphonic acid group and a derivative thereof.

5. The polymer electrolyte membrane according to claim 1, wherein the hydrocarbon polymer is a polyether ether ketone polymer, polyethersulfone polymer, or a mixture thereof.

6. A membrane electrode assembly for fuel cells in which the polymer electrolyte membrane for fuel cells according to claim 1 is interposed between an anode and a cathode that face each other.

7. A fuel cell comprising the membrane electrode assembly for fuel cells according to claim 6 and one or more separation plates,
   the fuel cell comprising:
   one or more electricity generators to generate electricity through electrochemical reaction of a fuel and an oxidizing agent;
   a fuel feeder to feed fuel to the electricity generators; and
   an oxidizing agent feeder to feed an oxidizing agent to the electricity generators.

* * * * *